(12) United States Patent
Ehmann et al.

(10) Patent No.: US 10,680,423 B2
(45) Date of Patent: Jun. 9, 2020

(54) DEVICE FOR INTRODUCING A CABLE INTO A ROOM

(71) Applicant: icotek project GmbH & Co. KG, Mögglingen (DE)

(72) Inventors: Bruno Ehmann, Mögglingen (DE); Valentin Ehmann, Schwäbusch Gmünd (DE)

(73) Assignee: ICOTEK PROJECT GMBH & CO. KG, Mögglingen (DE)

( * ) Notice: Subject to any disclaimer, the term of this patent is extended or adjusted under 35 U.S.C. 154(b) by 0 days.

(21) Appl. No.: 15/817,100

(22) Filed: Nov. 17, 2017

(65) Prior Publication Data

US 2018/0145493 A1    May 24, 2018

(30) Foreign Application Priority Data

Nov. 21, 2016  (DE) .................. 10 2016 013 791
Nov. 30, 2016  (DE) .................. 10 2016 223 853

(51) Int. Cl.
| H01B 17/30 | (2006.01) |
| H01B 7/02 | (2006.01) |
| H02G 3/22 | (2006.01) |
| H02G 3/06 | (2006.01) |

(52) U.S. Cl.
CPC ............ H02G 3/22 (2013.01); H01B 7/02 (2013.01); H01B 17/303 (2013.01); *H02G 3/0625* (2013.01)

(58) Field of Classification Search
CPC .......... C08L 21/00; C08L 23/06; C08L 23/12; C08L 23/16; C08L 27/06; C08L 77/00; C08L 83/04; C09J 7/02; C09K 3/10; H01B 7/02; H01B 17/303; H01B 17/30; H01R 9/032; H01R 9/0524; H01R 13/506;

(Continued)

(56) References Cited

U.S. PATENT DOCUMENTS 3,105,218 A * 9/1963 Kozinski ............. B05B 5/053
                                                338/214
3,829,850 A * 8/1974 Guetersloh ......... G08B 13/26
                                                340/515

(Continued)

FOREIGN PATENT DOCUMENTS

| AT | 339 404 | 10/1977 |
| DE | 77 21 629 | 10/1977 |
| DE | 103 56 386 | 5/2005 |

*Primary Examiner* — Timothy J Thompson
*Assistant Examiner* — Guillermo J Egoavil
(74) *Attorney, Agent, or Firm* — Faegre Drinker Biddle & Reath LLP

(57) ABSTRACT

The invention relates to an apparatus for carrying a cable, wherein the cable comprises a conductor, a shield braid surrounding the conductor,
a protective coat;
the protective coat is removed along a part of its length, so that the shield braid is exposed;
a housing surrounding the cable;
an electrical connection in order to establish a conductive connection between the shield braid and the housing;
a hinged sleeve is provided, which encloses the cable in the longitudinal section of the exposed shield braid;
the hinged sleeve consists of an electrically conductive material which is connected to the housing in a conductive manner.

19 Claims, 4 Drawing Sheets

(58) Field of Classification Search
CPC ........ H01R 13/52; H02G 3/0625; H02G 3/22; H02G 15/013
USPC .................. 174/668; 439/610, 180, 265, 320
See application file for complete search history.

(56) References Cited

U.S. PATENT DOCUMENTS

| | | | | |
|---|---|---|---|---|
| 5,199,903 | A * | 4/1993 | Asick | H01R 9/032 |
| | | | | 439/607.47 |
| 7,651,376 | B2 * | 1/2010 | Schreier | H01R 9/032 |
| | | | | 439/607.41 |
| 9,595,775 | B2 * | 3/2017 | Hanson | H01R 9/0503 |
| 9,799,319 | B1 * | 10/2017 | Yee | G10K 11/178 |
| 2005/0037656 | A1 * | 2/2005 | Cairns | G02B 6/3816 |
| | | | | 439/353 |
| 2008/0032556 | A1 * | 2/2008 | Schreier | H01R 9/032 |
| | | | | 439/607.41 |
| 2008/0042435 | A1 * | 2/2008 | Athalye | B60K 15/00 |
| | | | | 285/363 |
| 2012/0211274 | A1 * | 8/2012 | Drotleff | H02G 3/0666 |
| | | | | 174/360 |
| 2015/0044909 | A1 * | 2/2015 | Dunwoody | H01R 13/6593 |
| | | | | 439/607.56 |
| 2016/0087354 | A1 * | 3/2016 | Hanson | H01R 9/0503 |
| | | | | 439/98 |
| 2016/0134096 | A1 * | 5/2016 | Kett | H01R 31/02 |
| | | | | 174/360 |
| 2016/0285212 | A1 * | 9/2016 | Davidson, Jr. | H01R 9/0512 |
| 2017/0244192 | A1 * | 8/2017 | Baum | H01R 13/03 |
| 2018/0019547 | A1 * | 1/2018 | Maesoba | H01R 13/506 |

\* cited by examiner

DEVICE FOR INTRODUCING A CABLE INTO A ROOM

The invention relates to an apparatus according to the preamble of claim 1. Such apparatuses are also referred to as "cable bushing", for example in DE 103 56 386 B3.

The mentioned cables are, for example, introduced into a control cabinet. The cable comprises at least one conductor, generally in the form of a copper wire or a plurality of fine copper wires, a shield braid surrounding the conductor and finally an electrically non-conductive protective coat surrounding the shield braid. In the state of the art, the cable is usually enclosed by a housing in the form of a cable gland. The housing consists of an electrically conductive metal, for example of nickel-plated brass. The gland is inserted into or attached to a bore of a wall, for example the wall of a control cabinet. At the end of the cable which is inside the control cabinet in the assembled state, a switch or a plug or any other electrical device is connected to the conductor of the cable in an electrically conductive manner.

The apparatus as a whole fulfills different functions: It comprises a sealing ring which prevents the penetration of moisture or dust into the control cabinet. The shield braid serves as an electromagnetic shield. It is conductively connected to the cable gland via spring leaves and the conductive cable gland in turn is connected to the electrically conductive wall via which grounding takes place.

One disadvantage of this embodiment, among other things, is that the voids between the spring leaves are not covered. This means that the conductive protective shield is interrupted in these regions. Electromagnetic waves can penetrate these regions, which is a disadvantage.

One further disadvantage is that the diameter of the cable grand is large and that the opening of the control cabinet wall therefore must be sufficiently large. It is therefore not possible to introduce a ready-for-use, i.e. assembled component with a housing and a plug.

Further, the cable gland contains a strain relief.

From AT 339 404, a cable bushing is known wherein the cable is received in an electrically non-conductive material. A metallic pin is pressed through this material and penetrates the outer cable sheath and creates a contact with a shield braid. The pin is then pressed into a conical receptacle in such a way that it is also electrically connected to the housing. The assembly is very complex and installation is time-consuming. Disassembly is only possible to a certain extent. Further, due to the pressed-in pin, there is a high risk that an area of the shield braid is penetrated which has no wires or which cannot guarantee an overly good attachment between the individual wires and the pin, so that there is a risk of the shield being of bad quality.

Concerning the further state of the art, reference is also made to DE 77 21 692 U1.

With regard to the industrial interconnection of components, requirements are increasing. These concern the electromagnetic compatibility (EMC) of cable introduction equipment as well as the allowed seal against moisture and dust, strain relief and finally production and assembly.

The invention is therefore based on the task to fulfill the mentioned requirements in a better way than the apparatuses according to the state of the art. This task is solved with the features of claim 1.

The main idea of the invention consists of the following:

The sleeve consists of at least partially electrically conductive material, for example of an elastomer.

The housing consists at least partially of electrically conductive material.

The sleeve is connected to the housing in a conductive manner.

The hinged sleeve encloses the shield braid on a longitudinal section on which the protective coat had been removed.

The discharge of electromagnetic disruptive flows therewith goes from the shield braid via the electrically conductive sleeve, the electrically conductive housing, the wall of the control cabinet and thus forms a grounding.

The resulting advantages can be summarized as follows:

By using an electrically conductive sleeve, any connecting element which establishes an electrically conductive connection between the shield braid and the housing is omitted.

The electrically conductive sleeve directly abuts the housing. Thus, any void within the housing is avoided. This also means that the conductive protective shield is not interrupted, so that electromagnetic waves are not able to penetrate these regions.

The radial dimension of the apparatus is minimized by the electrically conductive sleeve. The apparatus can thus also be guided through relatively narrow openings in a control cabinet wall.

By using an electrically conductive sleeve and by its direct contacting abutment on the housing, conductive elements between these two, namely metal springs or the like, are spared, which saves the costs for providing such elements as well as for their assembly.

The complete apparatus including the cable, sleeves, housing and, if applicable, a plug, can be introduced into an opening of a wall, for example of a control cabinet, in its ready-for-use state.

According to a very advantageous development of the idea, a second, further sleeve may be provided as a seal against the penetration of moisture and dust and with the additional function of a strain relief.

The state of the art and the invention are explained in more details with reference to the drawings. These show the following:

FIG. 1 schematically shows a conventional EMC cable gland according to the state of the art. The electrically conductive cable is pushed through the gland.

Figure 1:
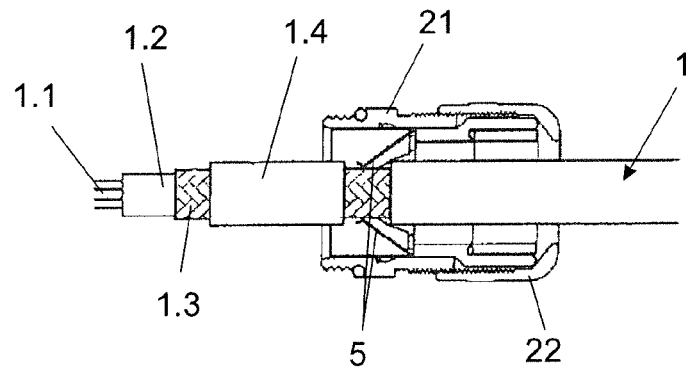

In the known embodiment shown in FIG. 1, a cable 1 can be seen. It comprises a multi-wired conductor 1.1. The conductor 1.1 is coated with an internal protective coat 1.2. The protective coat is coated with a shield braid 1.3. The shield braid 1.3 in turn is coated with an outer protective coat 1.4.

The cable 1 is surrounded by a housing 2. The housing comprises a threaded sleeve 2.1 with an external thread and a screw cap 2.2 with an internal thread. The housing further comprises a seal 3 and a strain relief 4.

The outer protective coat 1.4 is removed on an axial part of the cable 1, so that the shield braid 1.3 is exposed. A number of metal springs 5 creates an electrically conductive connection between the shield braid 1.3 and the housing 2. The housing 2 is electrically connected to a wall of a control cabinet which is not shown herein. A discharge of electromagnetic disruptive flows takes place from the shield braid 1.3 to the electrically conductive wall of the control cabinet via the springs 5.

Figure 2:
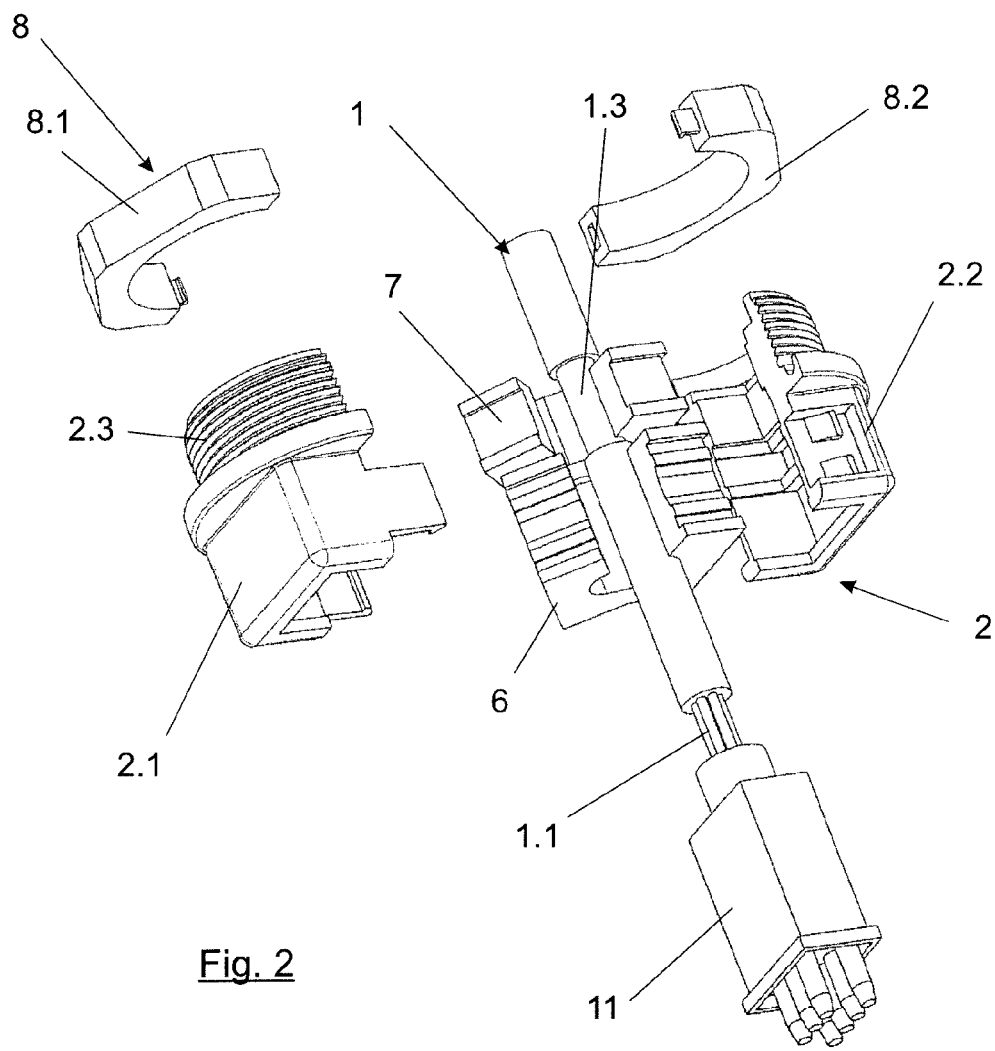
FIG. 2 shows the basic principle of the invention with a cable, an electrically conductive, hinged sleeve, an anti-dust-and-water sleeve, a housing and a plug arranged at one end of the cable.
Figure 3:
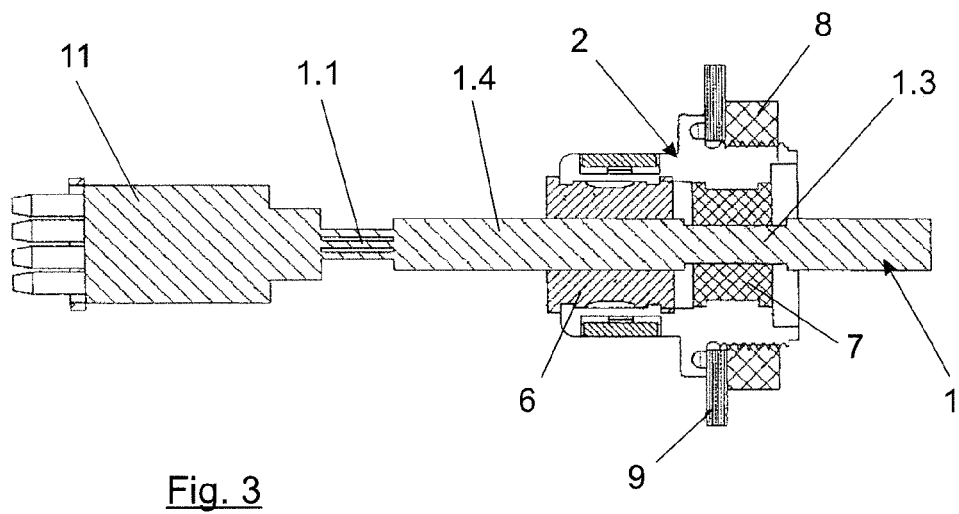
FIG. 3 shows the object of FIG. 2 in a plan view and in longitudinal section.

FIGS. 2 and 3 show an embodiment according to the invention. Here, there is also a cable 1 which has the same structure as the cable 1 according to FIG. 1. Thus, it has in turn a multi-wired conductor 1.1 surrounded by an internal protective coat 1.2 which is surrounded by a shield braid 1.3, which is in turn surrounded by an outer protective coat 1.4, and a plug 11.

Cable 1 is inserted into two hinged sleeves, namely a sealing sleeve 6 for the insulation from dust and water, and an electrically conductive sleeve 7. Both can be made of an elastomer. The elastomer of the sleeve 7 is electrically conductive. It may have filler materials and/or a coating suitable for this purpose.

In the collapsed state, the sleeve 7 and the sealing sleeve 6 enclose the cable 1. In the region of the sleeve 7, the outer protective coat 1.4 of the cable 1 is removed. The sleeve 7 surrounds the shield braid 1.3 and abuts it in a contacting manner. Due to the electrical conductivity of the sleeve 7, an electrically conductive connection is established between the shield braid 1.3 and the sleeve 7. The sealing sleeve 6 encloses the cable in the region of the outer cable coat 1.4 and thus provides for a very good seal.

Further, a two-part housing 2 can be seen. It consists of two parts 2.1 and 2.2. After closing the sleeve 7 and the sealing sleeve 6, the two housing parts 2.1 and 2.2 are put over the sleeve 7 and the sealing sleeve 6 and connected. They are fixed to each other by a lock. After connecting the housing parts 2.1 and 2.2, they form a thread 2.3. For the installation on a wall 9 of a control cabinet, the part of the housing 2 which is provided with the thread 2.3 is introduced through an opening in the wall 9 and screwed to a threaded ring 8. The threaded ring 8 is assembled from two ring halves 8.1 and 8.2.

The coat area of at least the electrically conductive sleeve 7 completely abuts the jamb of the bore of the housing 2. This also applies to the electrically conductive sleeve 7. This means that there is no gap and thus no cavity between the electrically conductive sleeve 7 and the housing 2. This can also apply to the sealing sleeve 6.

The electrically conductive housing 2 thus also establishes an electrically conductive connection between the shield braid 1.3, the sleeve 7, the housing 2 and the wall 9 which is also electrically conductive. This constitutes a reliable shield.

Figure 4:
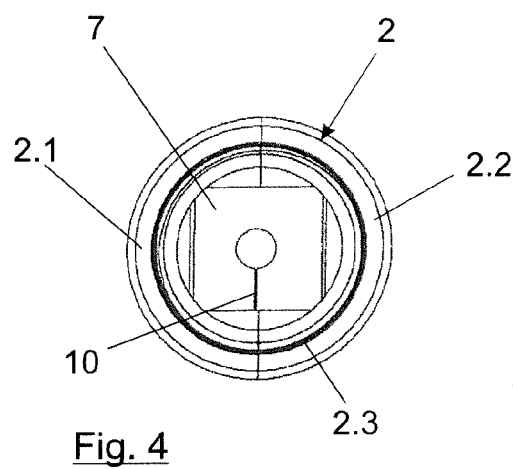
FIG. 4 shows a view of the assembly in FIG. 3 from the right without cable.
Figure 5:
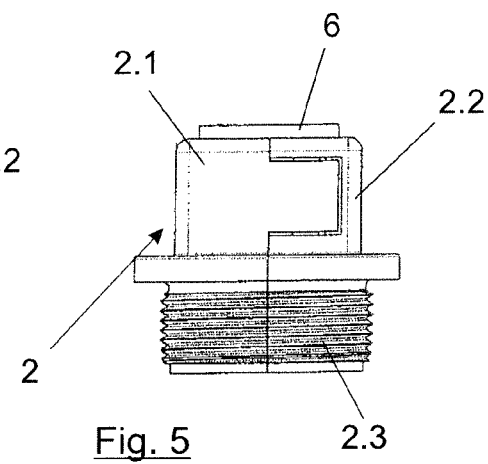
FIG. 5 shows an assembly of the view in FIG. 3 from the top without cable.
Figure 6:
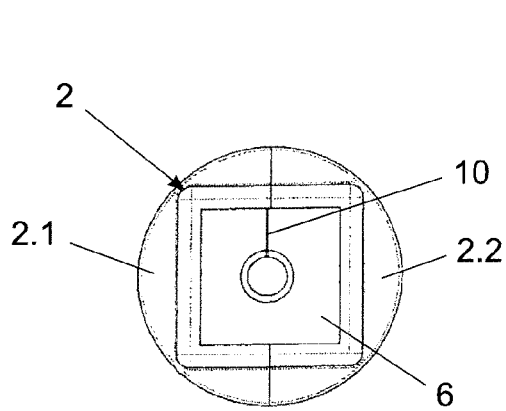
FIG. 6 shows an assembly of the Figure in the view from the left without cable.

The view of the assembly according to FIG. 3 shown in FIGS. 4, 5 and 6 without the inserted cable 1 again show the housing 2 and its two housing parts 2.1 and 2.2 and the electrically conductive sleeve 7 in the representation of FIG. 4 and the sealing sleeve 6 in the representation of FIG. 6. As can be seen, the two parts of the housing are clipped to one another, which is particularly noticeable in the representations of FIGS. 3 and 5. FIGS. 4 and 6 also show the slot 10 in the respective hinged sealing sleeve 6 and the sleeve 7 very clearly.

Figure 7:
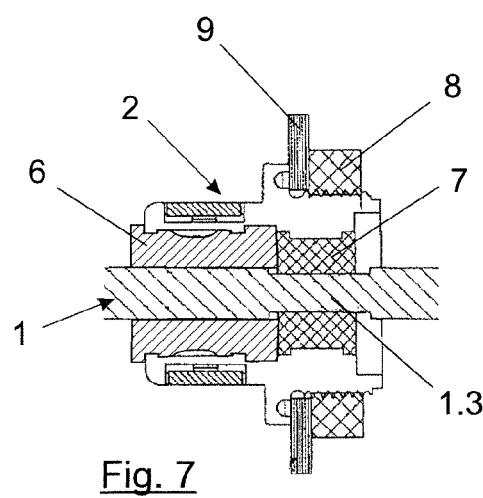
FIG. 7 shows a section analogous to the representation in FIG. 3 in an alternative embodiment.

In the representation of FIG. 7, a section of the assembly analogous to the representation in FIG. 3 can be seen. The only difference is that the electrically conductive sleeve 7 and the sealing sleeve 6 are not arranged in a spaced manner anymore, such as in the representation of FIG. 3, but, in this case, abut each other in a contacting manner, so that this results in a correspondingly compact assembly with a good seal.

Figure 8:
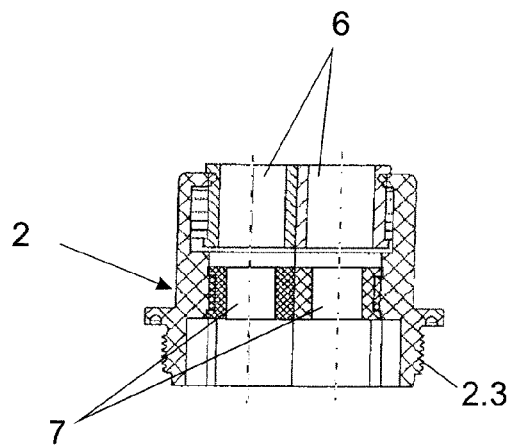
FIG. 8 shows a cross section through an alternative design variant for receiving more than one cable.
Figure 9:
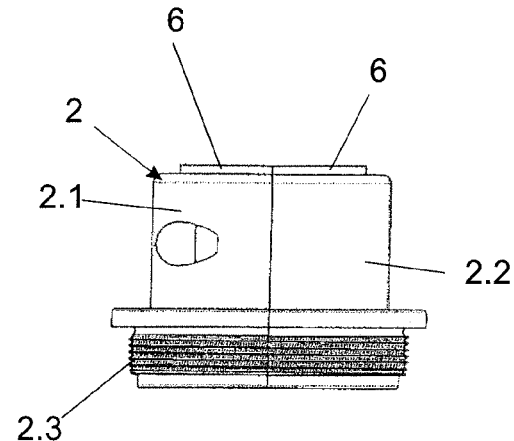
FIG. 9 shows the assembly of FIG. 8 in a side view.
Figure 10:
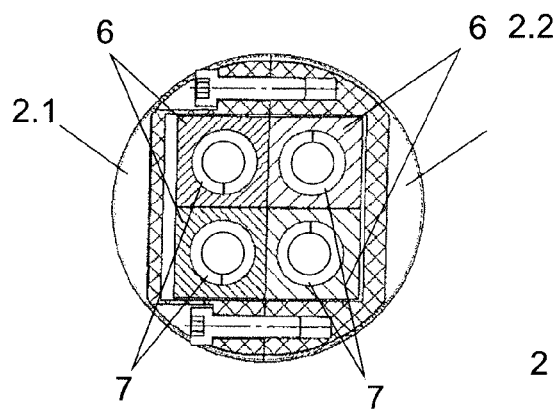
FIG. 10 shows the assembly of FIG. 8 in a partial section.
Figure 11:
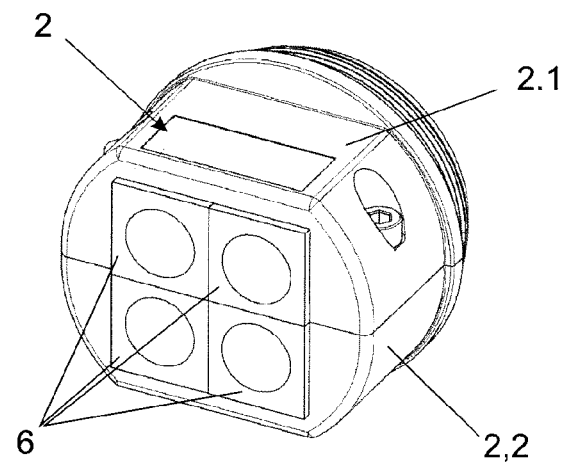
FIG. 11 shows the assembly of FIG. 8 in a three-dimensional view.
Figure 12:
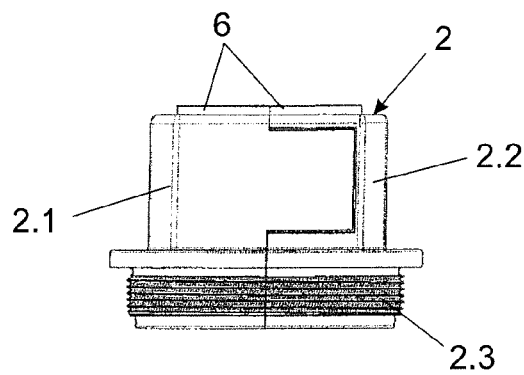
FIG. 12 shows the assembly of FIG. 8 in an alternative embodiment.
Figure 13:
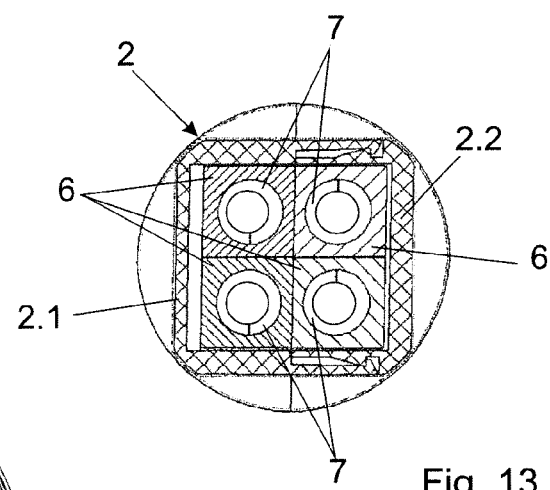
FIG. 13 shows the assembly of FIG. 8 in a partial section of the alternative embodiment.
Figure 14:
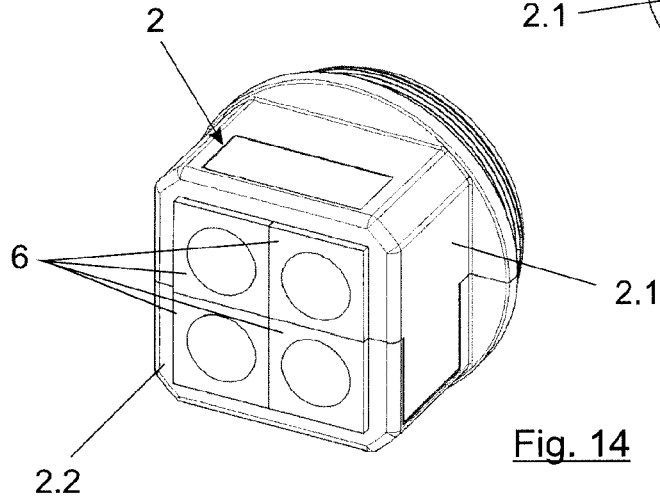
FIG. 14 shows the assembly of FIG. 8 in a three-dimensional view of the alternative embodiment.

In a cross section of the representation of FIG. 8, an assembly which shows two electrically conductive sleeves 7 and two sealing sleeves 6 can be seen. This assembly is also formed for receiving more than one cable 1. The representation of FIG. 8 shows the possibility of receiving two cables 1. As can be seen from the following FIGS. 9, 10 and the three-dimensional view in FIG. 11, it is really intended to receive four cables 1 in four sealing sleeves 6 and four electrically conductive sleeves 7. Alternatively, this assembly would theoretically also allow the introduction of a respective individual very large electrically conductive sleeve 7 and sealing sleeve 6 for receiving one individual cable with a very large diameter. The assembly according to FIG. 8 is, as already mentioned, shown in a first variant in FIGS. 9, 10 and 11. In this variant, the two halves 2.1 and 2.2 of the housing 2 are screwed together. An analogous representation can be found in FIGS. 12, 13 and 14 which show the assembly which is shown in cross-section in FIG. 8 again, wherein, contrary to the screwed embodiment of the housing halves 2.1 and 2.2, the housing halves 2.1 and 2.2 here are in turn clipped to one another, analogous to the representations in FIGS. 2 and 3.

It is useful to connect the electrically conductive sleeve 7 to the sealing sleeve 6 for protection against dust and moisture in series, so that the respective cable 1 or the cables 1 carry of the sealing sleeve 6 and the sleeve 7 in an axially shifted manner.

Figure 15:
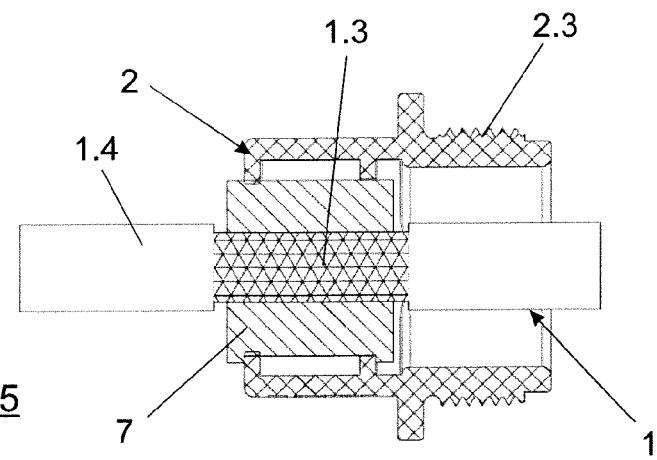
FIG. 15 shows an assembly with only one sleeve which has several functions.

However, it is also possible to provide embodiments with only one single sleeve 7 per cable 1, namely an electrically conductive sleeve 7. Such sleeve is represented in FIG. 15 analogous to the above-mentioned Figures. The sleeve 7 takes over the function of the electrical contact of the shield braid 1.3 and, up to a certain degree, sealing and strain relief functions as well. However, as the shield braid 1.3 itself is not sealed and possibly mechanically unstable as well, minor limitations must be accepted. However, depending on the application purpose, this can be possible without any problems.

The invention claimed is:

1. An apparatus for carrying a cable, wherein:
the cable comprises a conductor, a shield braid surrounding the conductor, and a protective coat;
the protective coat is removed along a part of its length, so that the shield braid is exposed in a longitudinal section;
a housing receiving the cable;
an electrical connection comprises a conductive connection between the shield braid and the housing, with a hinged sleeve which encloses the cable in the longitudinal section of the exposed shield braid, the hinged sleeve including a length and a slot disposed longitudinally along the length, the hinged sleeve receiving the cable along the length and such that the cable extends through the hinged sleeve and outwardly from the hinged sleeve on two sides thereof;

wherein the hinged sleeve comprises electrically conductive material which is connected to the housing in a conductive manner.

2. The apparatus according to claim 1, wherein:

the shield braid abuts the hinged electrically conductive sleeve; and the hinged electrically conductive sleeve abuts a jamb of a bore of the housing in a contacting manner.

3. The apparatus according to claim 1, wherein the housing comprises two housing parts which can be joined together.

4. The apparatus according to claim 1, wherein a thread for screwing into an opening of a wall is formed on the housing.

5. The apparatus according to claim 1, wherein the hinged electrically conductive sleeve is made of an electrically conductive elastomer.

6. The apparatus according to claim 1, further comprising a hinged sealing sleeve which surrounds the cable.

7. The apparatus according to claim 6, wherein the sealing sleeve and the hinged electrically conductive sleeve abut each other without any axial distance therebetween.

8. The apparatus according to claim 6, wherein the sealing sleeve and the hinged electrically conductive sleeve are spaced apart from each other at an axial distance.

9. The apparatus according to claim 7, wherein the hinged electrically conductive sleeve is made of an electrically conductive elastomer.

10. The apparatus according to claim 8, wherein the hinged electrically conductive sleeve is made of an electrically conductive elastomer.

11. The apparatus according to claim 1, wherein, when the apparatus is disposed such that there is electrical contact between the housing and an electrical ground, an electrical grounding extends from the shield braid through the hinged electrically conductive sleeve and the housing to the electrical ground.

12. The apparatus according to claim 11, wherein the electrical ground is a wall.

13. The apparatus according to claim 12, wherein the wall is a wall of a control cabinet.

14. The apparatus according to claim 11, wherein the electrical grounding conducts a discharge of electromagnetic disruptive flows from the shield braid to the electrical ground.

15. The apparatus according to claim 14, wherein the electrical ground is a wall.

16. The apparatus according to claim 15, wherein the wall is a wall of a control cabinet.

17. An apparatus for carrying a cable, wherein:

the cable comprises a conductor, a shield braid surrounding the conductor, and a protective coat;

the protective coat is removed along a part of its length, so that the shield braid is exposed in a longitudinal section;

a housing receiving the cable;

an electrical connection comprises a conductive connection between the shield braid and the housing, with a hinged sleeve moveable between an open position to radially receive the cable and a closed position to enclose the cable in the longitudinal section of the exposed shield braid such that the cable extends through the hinged sleeve and outwardly from the hinged sleeve on two sides thereof, wherein the hinged sleeve comprises electrically conductive material which is connected to the housing in a conductive manner.

18. The apparatus according to claim 1, wherein the slot extends over the entirety of the length of the hinged sleeve.

19. The apparatus according to claim 1, wherein the hinged sleeve is (1) hingedly openable along the length for receiving the cable in the slot and (2) hingedly closeable along the length to enclose the cable in the slot while the cable extends outwardly from the hinged sleeve on the two sides thereof and electrically conductively connect the hinged sleeve to the cable.

* * * * *